United States Patent [19]

Rider, Jr.

[11] 4,383,954

[45] May 17, 1983

[54] FORMING AND DELIVERING STACKABLE ARTICLES

[75] Inventor: Edward W. Rider, Jr., Matamoras, Pa.

[73] Assignee: Genpak Corporation, South Glen Falls, N.Y.

[21] Appl. No.: 251,121

[22] Filed: Apr. 6, 1981

Related U.S. Application Data

[63] Continuation of Ser. No. 22,777, Mar. 22, 1979, abandoned.

[51] Int. Cl.³ .................. B29C 17/02; B29C 17/04
[52] U.S. Cl. .................. 264/40.5; 264/40.1; 264/544; 264/238; 264/321; 425/150
[58] Field of Search .......... 264/40.1, 40.5, 544, 264/553, 554, 153, 238, 296, 321, 322; 425/135, 150; 209/3.1, 3.2, 3.3; 53/495; 493/28, 35

[56] References Cited

U.S. PATENT DOCUMENTS

| | | | |
|---|---|---|---|
| 1,450,427 | 4/1923 | Cannard et al. | 493/357 X |
| 1,923,061 | 8/1933 | Bares et al. | 493/28 X |
| 3,163,413 | 12/1964 | Franke et al. | 493/35 |
| 3,520,404 | 7/1970 | Pine | 209/3.3 |
| 3,523,474 | 8/1970 | Kinslow, Jr. | 264/153 X |
| 3,577,495 | 5/1971 | Pearl et al. | 264/153 |
| 3,619,443 | 11/1971 | Feldman | 264/238 X |
| 3,632,252 | 1/1972 | Amberg et al. | 264/553 X |
| 3,802,819 | 4/1974 | Alroy | 425/135 |

Primary Examiner—Jan H. Silbaugh
Attorney, Agent, or Firm—Stevens, Davis, Miller & Mosher

[57] ABSTRACT

Method and apparatus for continuously forming articles and stacking them ready for formation of batches from the stack. Some of the articles are treated by being given a disfigurement which makes them identifiable in the stack so that batch lengths containing predetermined numbers of articles are clearly seen. These disfigurements are caused by moving a moveable element forming part of the forming surface of the machine whereby the surface shape is changed to cause change in shape of the articles. The invention is particularly useful during forming and stacking of shallow thermoformed thermoplastic articles.

7 Claims, 15 Drawing Figures

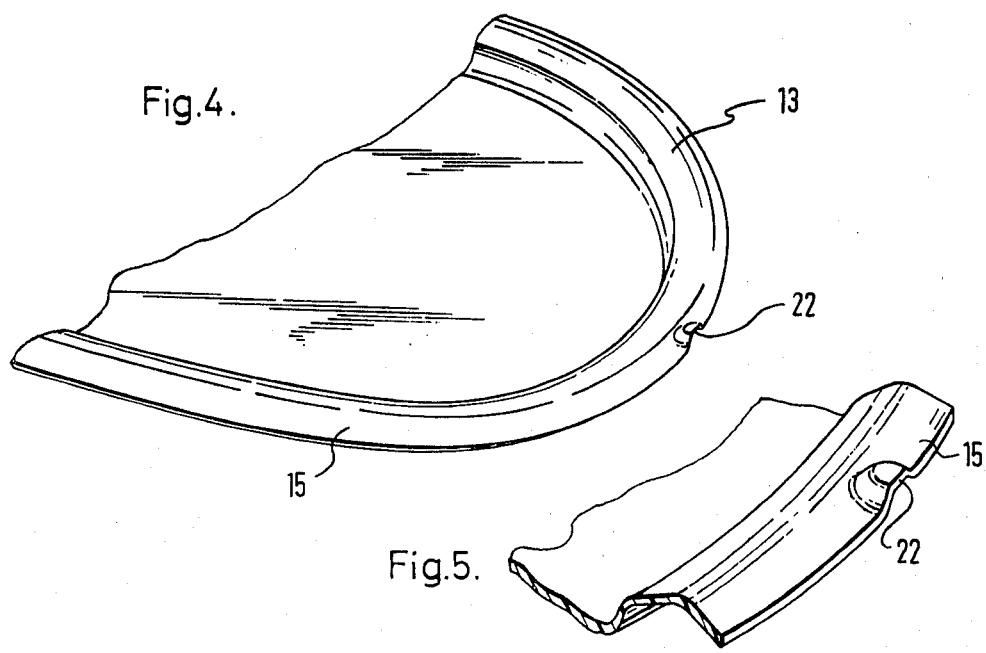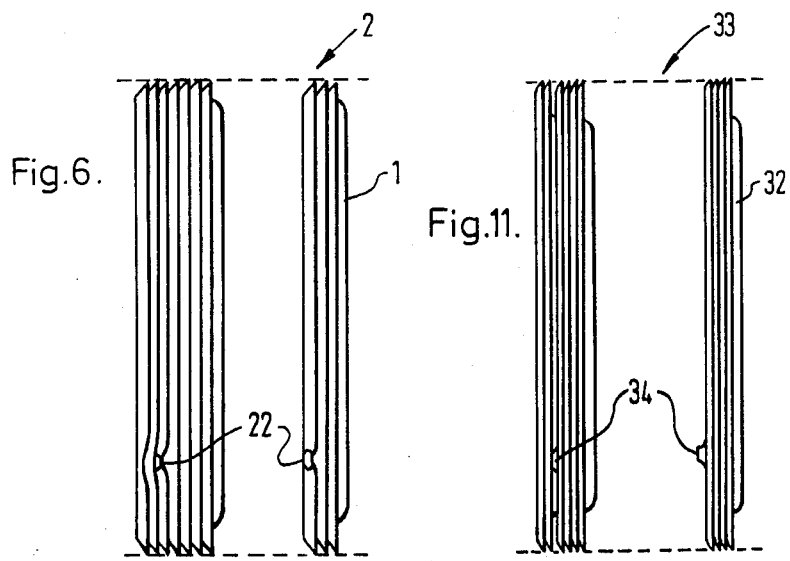

FORMING AND DELIVERING STACKABLE ARTICLES

This is a continuation of application Ser. No. 22,777 filed Mar. 22, 1979 now abandoned.

This invention relates to forming stackable articles and delivering the articles in the form of a stack.

In the continuous production of stackable articles by a moulding or pressing operation, the formed articles are sometimes passed individually to a delivery station from where they may be removed for packing in batches.

For quantity and cost control, it is important that each package contains a specified number of formed articles. To assist in the packing process, it is normal for the articles to be stacked automatically in vertically or horizontally oriented stacks and these stacks are then separated into batches.

In cases where formed articles are of cup shape and therefore have substantial depth, it is possible for an automatic counting device to ensure that each batch contains a predetermined number of articles. An operator may also judge accurately by the height of stacked cup shaped articles when a batch contains the required number.

In the stacking of shallow articles such as dishes, plates or bowls, these are less controllable by a machine after separation into individual containers and the height of a stack changes imperceptibly as each container is added to it.

Forming separate batches from stacks of these shallow articles is performed manually by a machine operator. In one method, the operator estimates the number of articles in a batch by the stacked height. However, as the addition or renewal of shallow articles produces no significant difference in stacked height, it is virtually impossible for the operator to form standard size batches.

In another method of separating batches, the number of articles is adjusted until batch weight corresponds to a predetermined weight. However, this process is slow and is subject to error when the articles have been thermoformed from thermoplastic sheet as sheet thickness may vary. Thus, wide variation in numbers is possible in batches controlled on a weight basis.

Because of the difficulties involved in forming separate batches of predetermined numbers of articles, it is a tendency for article manufacturers to oversize their batches to ensure that at least the ordered quantity of articles for a customer is delivered.

In an effort to prevent the amount of shallow articles from varying outside specified limits from a predetermined number in batches, it is important to employ a system of quantity control. This involves the employment of a person to count the numbers of articles in batches or cartons filled with batches selected randomly. In cases where numbers of batched or cartoned articles lie outside the specified limits, the batch or carton is rejected. This may then lead to further rejection upon investigation into quantities of articles in adjacent batches or cartons. Quantity control carried out in this fashion is responsible for up to 40% of all rejected articles. Thus, errors involved in sizing the batches may be very costly to the article manufacturer.

The present invention provides a method of continuously forming stackable articles in a forming machine and providing a stack of articles which results in batches of articles, even shallow articles, being easily recognized while still in the stack, so that each batch is removable with an exact predetermined number of articles. This recognition of each batch is made possible by subjecting some of the articles while forming them, to a treatment so as to cause the positions of the treated articles to be readily identifiable either manually or by a sensing machine, the positions for providing said treated articles being predetermined in relation to desired numbers of articles in batches to be removed from the stack. According to the inventive method, the formed articles are delivered into the stack in a predetermined order in relation to the order in which they are formed so that the positions of the treated articles differentiate between successive batches in the stack.

The inventive method is relevant to any method of forming stackable articles by a continuous process and in which it is possible to positionally control the articles after manufacture so as to form them into a stack. The invention is particularly pertinent, however, to a process involving the shaping of articles from continuous formable sheet which may be of metal. Of particular interest, however, is the manufacture of thermoplastic articles upon a thermoforming machine as it is in this field that the batching of articles is most usually carried out and in which all the above disadvantages in conventional batching methods are apparent.

The inventive method anticipates the use of three basic ways of treatment to enable the positions of treated articles to be identified in a stack. In a first and preferred way, each treated article is subjected to treatment by providing a disfigurement to a marginal region which is visually apparent when articles are in the stack. This disfigurement may be a projection or indentation in the marginal region. In a second way, a projection is provided upon each treated article which has the effect of spacing the treated article slightly from the next adjacent article in at least one circumferential position. This second way is not preferred because it must rely upon articles in the stack being closely held together before the spacing between the treated and next adjacent articles becomes apparent.

In the third way, the treatment of each treated article is by providing colouration to a marginal region which is visually apparent when articles are in the stack. This method may not be acceptable for containers to be used as food containers or foodstuffs for reasons of toxicity but could be useful for containers for other products.

To enable the projections or indentations to be provided, a moveable mould element may be used. This mould element is conveniently a plunger having an end moveable relative to a mould part and having an end defining part of the forming surface. Movement of the plunger outwardly or inwardly of the mould part provides an indentation or projection upon the mould surface respectively to provide a projection or indentation on the treated articles.

In the method of the invention, the treated articles may be provided in a spaced fashion so as to locate a treated article at an end of each batch so that each batch is readily identifiable as extending from one treated article to the next while including one of the treated articles at the end of the batch. Alternatively, the treated articles are formed consecutively in amounts each sufficient to form a batch in the stack, each amount alternating with amounts of consecutive untreated articles, and the amounts of the untreated articles also being sufficient to form batches.

The invention also includes apparatus for continuously forming stackable articles and forming a stack of said articles comprising a forming machine having at least one mould part defining at least one article forming surface; a mould element movably mounted upon the mould part to define part of the article forming surface in a specific surface position, movement of the mould element effecting change in shape of the forming surface at said specific position; an automatic counting means for counting forming operations as they are performed; means for transmitting a signal to the counting means each time a forming operation is performed; means for moving the mould element to change the shape in said forming surface, said moving means being operably connected to the counting means to cause movement of the mould element after a predetermined number of signals have been received by the counting means; and a stack forming means for collecting the articles in a stack in predetermined order in relation to the order in which they are formed.

Embodiments of the invention will now be described, by way of example, with reference to the accompanying drawings in which:

FIG. 4 is an isometric view of part of an article made upon the apparatus of the first embodiment;

FIG. 5 is an isometric view of part of the article on a larger scale;

FIG. 6 is a view in the direction of arrow VI in FIG. 1 showing finished articles in a horizontal stack;

FIG. 11 is a view similar to FIG. 6 showing stacked articles made upon the apparatus of FIG. 8;

Figure 1:
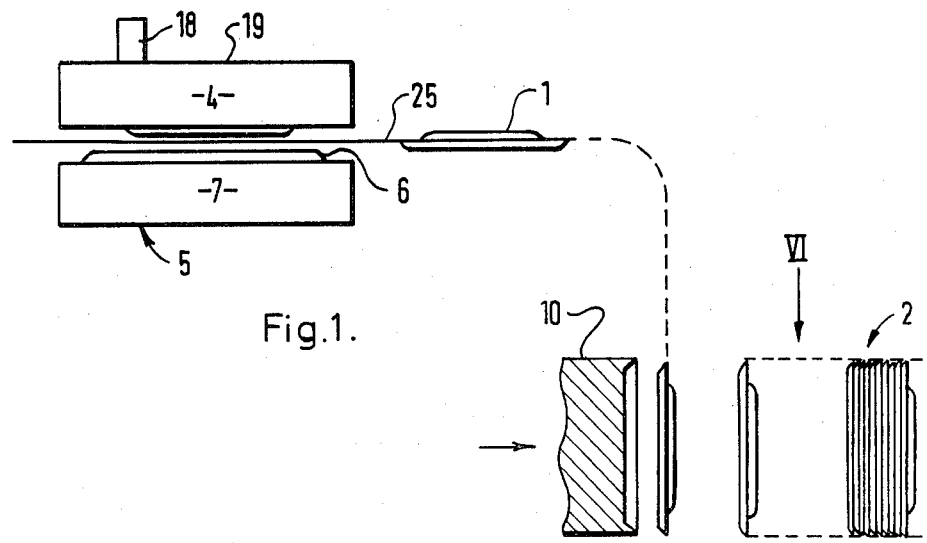
FIG. 1 is a side elevational view, partly diagrammatic, of apparatus forming a first embodiment.

In a first embodiment as shown in FIG. 1, apparatus for forming stackable articles in the form of plates 1 and then for forming a stack 2 of the plates is basically of conventional design. In the conventional manner, the apparatus comprises a thermoformer 3 disposed in a thermoforming station. The thermoformer comprises a mould part 4 disposed above a pass line for thermoplastic unfoamed sheet, such as high impact polystyrene or polyethylene, and a clamp device 5 disposed beneath the mould part on the other side of the pass line for vertical movement towards and away from the mould part. The operation of the thermoformer is conventional in that it operates from an open position (FIG. 1) in which the sheet may be fed intermittently through it, to a closed position (FIG. 2), in which an annular rubber seal 6 acts against the sheet to form a fluid-tight chamber defined by the sheet, the seal and a main body 7 of the clamp device. Air under pressure is then applied into the chamber through passages 8 in the main body 7 to urge the sheet into intimate contact with a forming surface 9 of the mould part 4 for shaping each plate as shown in FIG. 2.

After release from the thermoformer, each plate is fed forwardly by movement of the sheet along the pass line, to a trimming device which has a horizontally operating cutter 10 to sever individual plates 1 from the sheet and, in conventional fashion, deposit them in the stack 2 which lies horizontally upon a supporting structure, not shown, for manual removal of the plates in batches for packaging.

Figure 2:
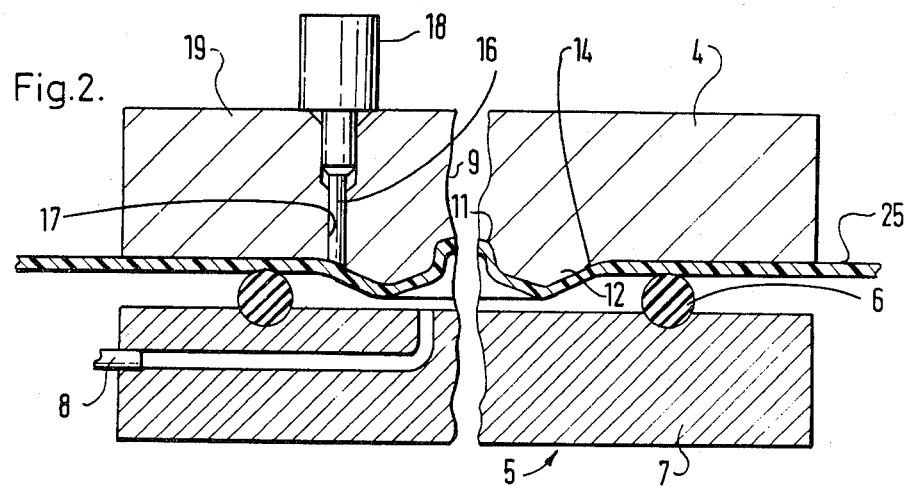
FIG. 2 is a cross-sectional view in side elevation on a larger scale than FIG. 1 of a part of a thermoformer which is included in the apparatus of FIG. 1.
Figure 3:
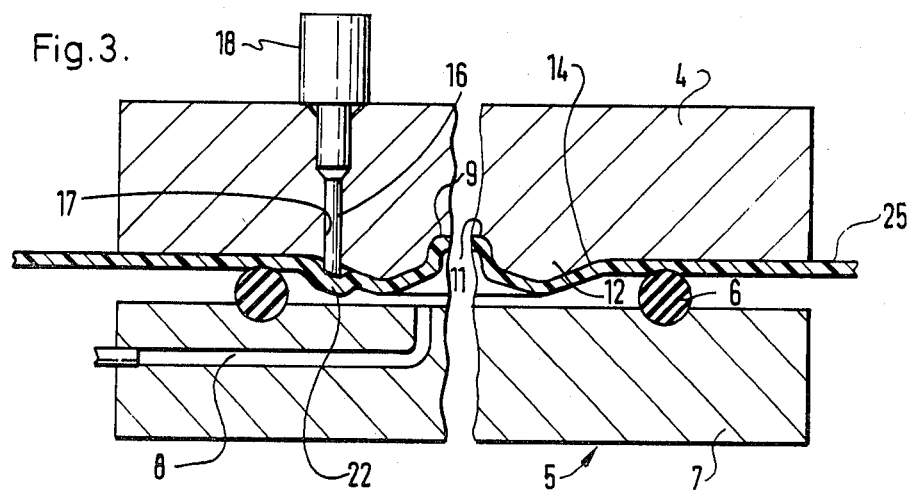
FIG. 3 is a view similar to FIG. 2 of the part of the thermoformer showing it in a different stage of operation.

As shown in FIGS. 2 and 3, the mould part, for convenience of description, comprises a single forming surface 9 but it is to be understood that a plurality of forming surfaces may be disposed laterally of the pass line to produce a plurality of lines of shaped plates extending along the sheet to the trimming device. In this case, a cutter would be provided for each line of plates to produce a stack of plates from each line.

The forming surface 9 comprises a main dished portion 11 which is encompassed by an annular ridge 12 to provide a sloping raised rim 13 (FIG. 4) to each plate, the ridge having a frusto-conical border 14 for providing a downwardly extending frusto-conical flange 15 to each plate rim.

The apparatus differs, according to the invention, from conventional apparatus in that it includes a mould element movably mounted upon the mould part 4. This mould element comprises a cylindrical plunger 16 which is slideably received in a cylindrical guide hole 17 in the mould part, axial movement of the plunger being controlled by a double acting piston and cylinder assembly 18 which is securely mounted upon a back face 19 of the mould part. This piston and cylinder assembly is relatively small compared with the mould part thus enabling it to be carried thereby. The assembly 18 is constructed in the manner described and claimed in a patent application filed concurrently herewith, applicant Edward Rider, and entitled "Piston and Cylinder Assembly". Accordingly, as described in the concurrently filed application, the piston and cylinder assembly prevents rotation of the plunger 16 within the mould part 4 thus making unnecessary any provision between mould part and plunger for preventing its rotation.

The plunger is directly driveably connected to the piston of assembly 18 at one end and at the other end, the plunger surface is shaped so that in a withdrawn position (FIG. 2), it blends with the surface shape of the border 14 of the mould part 4. The plunger is moveable by operation of the assembly 18 from its withdrawn position to an extended position (FIG. 3) in which its other end protrudes from the surface of the border 14 to a distance of about 0.125 inches so as to change the shape of the forming surface.

With the plunger in its extended position, plates 1 are thermoformed around the plunger (FIG. 3) so as to have a disfigurement caused by the protruding end of the plunger. This disfigurement is in the form of a protrusion 22 (FIGS. 4 and 5) in the rim flanges 15 of the plates.

Figure 7:
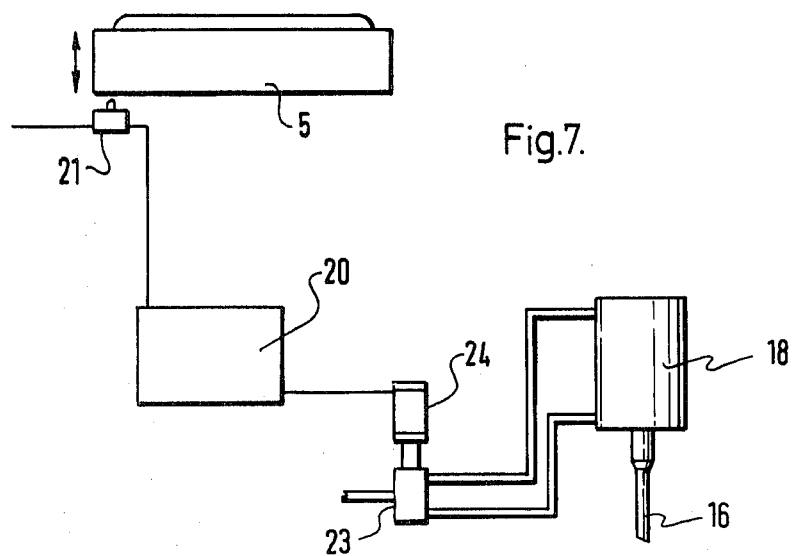
FIG. 7 is a diagrammatic representation of part of an operating means of the apparatus.

An automatic counting means is included for counting forming operations as they are performed. This counting means comprises an electrically operated counting device 20 (FIG. 7) and means for transmitting a signal to the device each time a forming operation is performed. As shown by FIG. 7, a convenient transmitting means is in the form of contacts 21 which are automatically closed by downward movement of the clamp device 5, although clearly other transmitting means operable by other parts of the apparatus working in the thermoforming cycle of operation, may be used.

The counting device is set electrically so as to count a predetermined number of forming operations with the plunger in its withdrawn position so that no disfigurements are formed upon the plates. Upon the predetermined number of operations being reached, the counting device causes the plunger to move to its extended position to provide a plate with a protrusion 22, the plunger then being withdrawn for the next succeeding forming operation. A means for moving the plunger is operably connected to the counting means and includes the piston and cylinder assembly 18 and a four-way hydraulic spool valve 23 operation of which is controlled by a solenoid 24 (FIG. 7), actuable by closing of contacts within the counting device upon reaching the predetermined number of operations.

The predetermined number of operations between successive extensions of the plunger plus one operation with the plunger extended is equal to the desired amount of plates required in a batch to be removed manually from the completed stack.

In use of the apparatus of the first embodiment, a length of thermoplastics sheet 25 is fed intermittently along the pass line. After each movement of the sheet, the clamp device 5 moves upwards to grip the sheet against the mould part 4 and a thermoforming operation takes place to make a plate 1.

After each withdrawal of the plunger 16, the counting device counts up to the predetermined number of forming operations and then effects actuation of the plunger to its extended position as described above. The next forming operation then provides a plate with a protrusion 22, or in other words, subjects it to a treatment which will cause its position to be identifiable when in the stack 2. Each plate having a protrusion 22 is thus a "treated" plate and will be so referred to in this embodiment.

The plates are then moved in succession by the sheet movement into the trimming device wherein the cutter 10 severs the plates in succession from the sheet and deposits them at the adjacent end of the stack 2 being formed. In the stack 2, the positions of the treated plates are readily identifiable. As shown in FIG. 6, if the plunger 16 is disposed in a correct angular position around the axis of the forming surface 9, then the protrusions 22 will face upwardly in the stack. The flanges 15 are visible in the stack, thus rendering the protrusions immediately noticeable, especially if they have the effect of distorting adjacent rims away from one another as shown by FIG. 6.

Hence, each batch of plates is removed manually by a machine operator merely by removing plates at the end of the stack remote from the trimmer, the number of plates for each batch extending up to and possibly including the next treated plate so that a treated plate provides the end plate at one end of the batch or the other.

It is apparent, therefore, that by the method of forming plates according to the invention and as described in the first embodiment, any errors in estimating the numbers of plates to make up batches within specified limiting numbers is completely avoided. On the contrary, the inventive method enables batches of plates to be removed from the stack, quickly and easily, while ensuring absolutely that each batch contains the exact number of plates which is required.

It is not necessary for treated articles to be spaced by untreated articles as described in the first embodiment to determine batch lengths. Any pattern for the formation of treated and untreated plates is suitable for indicating ends of batches in a stack so long as the pattern is recognizable.

For instance, in one modification of the first embodiment (not shown), the counting device 20 is set electrically so that all of the untreated plates are replaced by treated ones and the treated plates are replaced by untreated ones. Thus in each batch, all treated plates are used except for an end untreated plate.

Alternatively, in another modification (not shown), two or more treated plates are provided together in a stack for an end of each batch.

As a further alternative, amounts of consecutively treated plates each sufficient to form a complete batch alternate with amounts of consecutively untreated plates each of which amounts are also sufficient to form a complete batch. Hence, each whole batch taken from the stack is composed entirely either of treated or untreated plates.

As already mentioned, the above embodiment employs only one forming surface. In addition to or instead of a plurality of forming surfaces disposed laterally to the pass line as previously mentioned, in another modification a plurality of forming surfaces may extend along the direction of movement of the sheet along the pass line. Thus on each forming operation, a plurality of plates are formed in line extending longitudinally of the sheet. One or more of the forming surfaces may be subjected to change in shape for providing treated plates in the manner described in the first embodiment to result in treated plates being disposed at any desired distance apart in the stack of plates so as to provide batches of any predetermined amount.

In the above embodiment, the positions of treated articles in the stack are apparent mainly because the protrusions 22 are visually apparent. The invention is not concerned only with a method in which the distinguishing feature of the treated articles is visible in a stack but also with any treatment which makes the positions of the treated articles identifiable. Thus, in the stacking of articles, any means which spaces articles or parts of the rims of articles so as to interrupt the continuity of the spacing is sufficient to identify the positions of the treated articles and thus of the stack ends.

The above is illustrated in a second embodiment in which treated articles are spaced slightly from adjacent untreated articles while protrusions on the treated articles which cause the spacing are less apparent than in the first embodiment.

Figure 8:
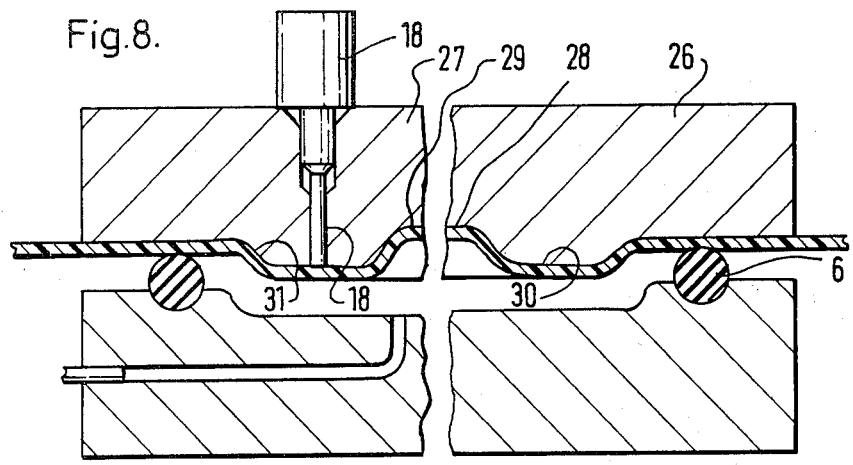
FIG. 8 is a view similar to FIG. 2 of part of a thermoformer included in apparatus forming a second embodiment.
Figure 9:
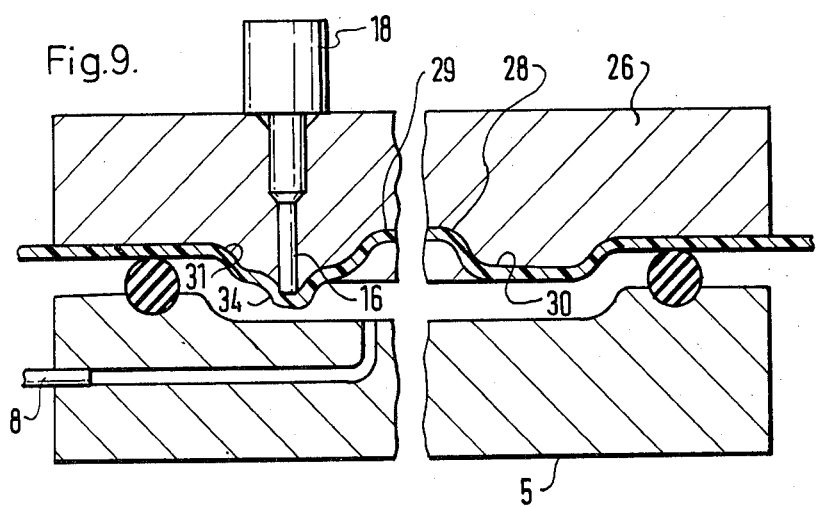
FIG. 9 is a view of the part of the thermoformer of FIG. 8 showing it in a different stage of operation.

In the second embodiment, as shown in FIGS. 8 and 9 in which parts of apparatus similar to those in the first embodiment bear like reference numerals, apparatus for forming plastic plates comprises a thermoformer 26 with a clamp device 5 similar to that of the first embodiment. A mould part 27 has a plunger 16 moveable through it by means similar to that in the first embodiment.

A forming surface 28 of the mould part has a dished portion 29 surrounded by a planar surface rim portion 30 with edge flange portion 31. The plunger 16 is located so as to project from the rim portion 30 when moved to its extended position as shown by FIG. 9.

Figure 10:
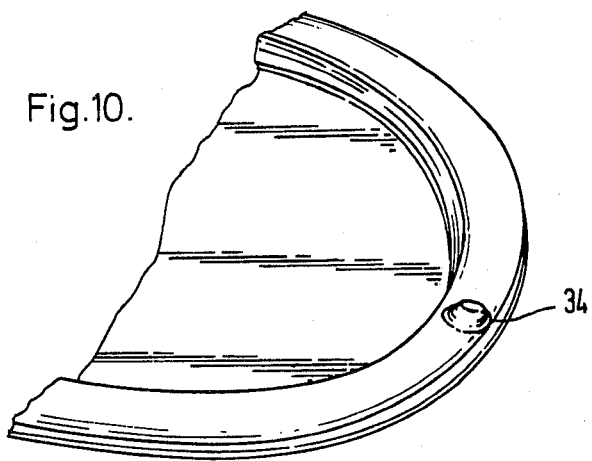
FIG. 10 is an isometric view of part of an article made upon apparatus of the second embodiment.

In use of the apparatus of the second embodiment, plates 32 are thermoformed in a manner similar to that described for the first embodiment and are stacked to form a stack 33 (FIG. 11). Because of the location of plunger 16, treated plates of the second embodiment have boss-shaped protrusions 34 extending upwardly from their rims as shown in FIG. 10. When in the stack as shown in FIG. 11, the protrusions 34 are partly shielded by rim flanges of adjacent plates. However, the positions of the treated plates may be seen because adjacent rims of plates are held distorted apart by the protrusions 34 acting between them so that an interruption in the spacing of the plates is easily seen to enable batch lengths to be determined.

In a third embodiment, apparatus is provided for making bowls from foam polystyrene. This apparatus differs from that of the first embodiment solely in the design of thermoformer 35 shown in FIGS. 12, 13 and 14. This thermoformer comprises two matching mould parts 36 and 37 which are moveable from an open mould position (FIG. 12) to a closed mould position (FIG. 13) for moulding the bowls 38 from foam polystyrene sheet 39 in between opposed forming surfaces.

Figure 14:
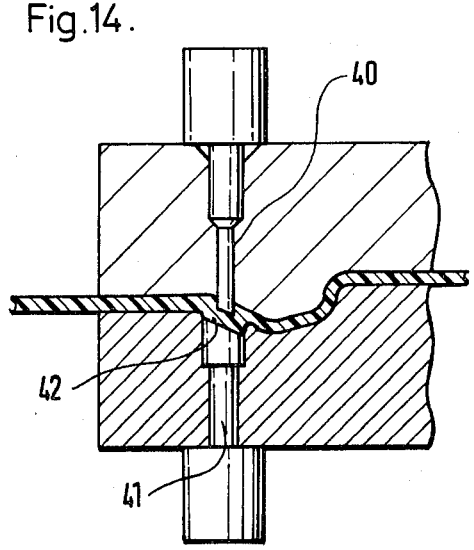
FIG. 14 is a view of part of the thermoformer of FIG. 12 showing another stage of operation.
Figure 12:
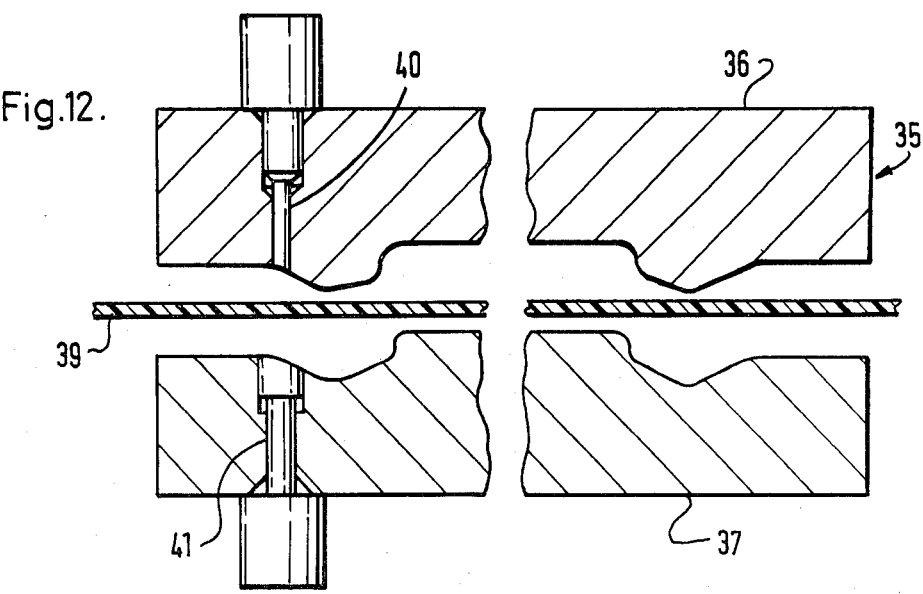
FIG. 12 is a view similar to FIG. 2 of part of a thermoformer included in apparatus forming a third embodiment.
Figure 13:
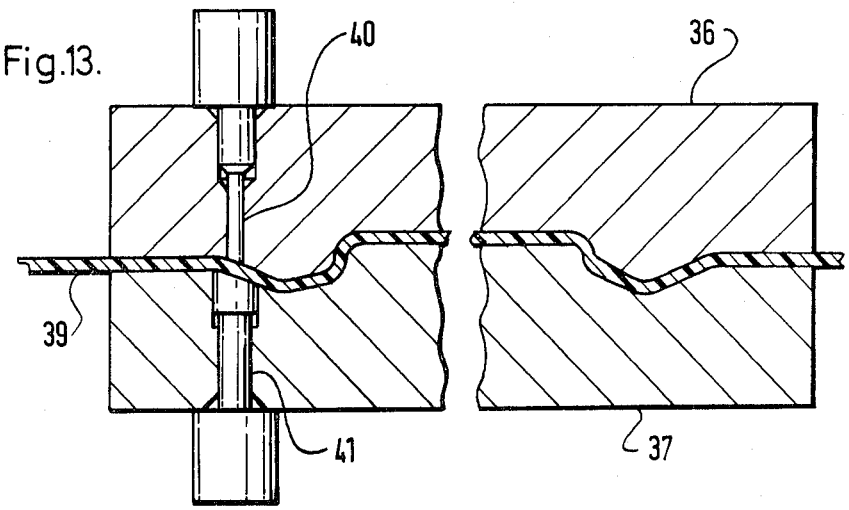
FIG. 13 is a view of part of the thermoformer of FIG. 12 showing it in a different stage of operation.
Figure 15:
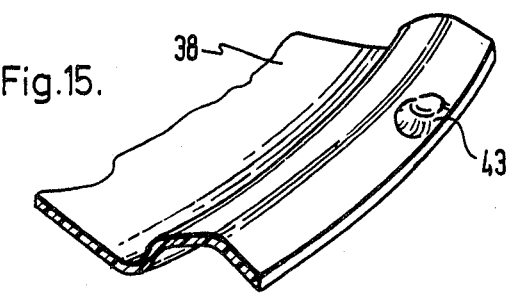
FIG. 15 is an isometric view of part of an article made upon apparatus of the third embodiment.

In this embodiment, two opposing plungers are necessary for moulding the protrusions. As may be seen from FIGS. 12, 13 and 14, these plungers 40 and 41 are axially aligned in the mould parts. For making untreated bowls, i.e. devoid of protrusions, the plungers are in positions with opposing ends flush with the mould forming surfaces (FIGS. 12 and 13). The two plungers are operated in unison by means similar to that described in the first embodiment to create a forming surface part for the protrusions for treated bowls. As shown in FIG. 14, the plungers are moved in the same direction so that one plunger forms a cavity 42 and the other plunger extends towards the cavity whereby hollow protrusions 43 are formed adjacent edges of the rims on the treated bowls as shown in FIG. 15. These protrusions 43 are visually apparent in the final stack of bowls (not shown) in a manner similar to that shown in FIG. 6.

What is claimed is:

1. A method of continuously forming stackable articles in a moulding machine and forming a stack of said articles easily identifiable as to equally numbered batches of said stack comprising,
   (a) feeding a sheet of mouldable material along a pass line and through a moulding station of the machine; said machine having a plunger as a part of and flush with a mould surface when making identically moulded stackable articles;
   (b) repeating a cycle of a moulding operation to make a predetermined number of identical articles in succession;
   (c) stacking said identically moulded articles;
   (d) thereafter during the repeating cycle of moulding at least one article, following the moulding operation making a predetermined number of identical articles, moving said plunger from said mould surface to alter said mould surface configuration and subject said article to an additional moulding treatment so that said additionally moulded article is easily identifiable from said identically moulded articles;
   (e) placing said additionally moulded article in said stack; and
   (f) continuously repeating steps (a), (b), (c), (d) and (e).

2. The method according to claim 1 comprising providing consecutively treated articles in amounts each sufficient to form a batch in the stack and alternating said amounts with amounts of consecutively untreated articles, the amounts of the consecutively untreated articles also forming batches in the stack.

3. The method according to claim 1, wherein the sheet is unfoamed thermoplastics sheet and is brought into intimate contact with a forming surface by differential pressure conditions upon the two surfaces of the sheet, and at the specific surface position of the forming surface, the forming surface is partially formed by one end of said plunger which is flush with said forming surface when making identically moulded stackable articles, the plunger being moved relative to the forming surface to extend therefrom to alter the forming surface configuration at the specific position for forming each of said additionally moulded articles.

4. The method according to claim 1, wherein the sheet is a foamed thermoplastics sheet and is disposed between two opposed forming surfaces in the forming station, the sheet being shaped into articles by closure of the mould parts to bring the forming surfaces into intimate engagement with the two sides of the sheet, and at specific opposing positions of the forming surfaces, plungers have ends defining parts of the forming surfaces and flush therewith, the plungers being moved relative to the forming surfaces in the same direction to extend and withdraw therefrom to alter the forming surfaces configurations in said opposing positions for forming each of said additionally moulded articles.

5. The method according to claim 1 wherein each article is formed with a rim and the treated articles are subjected to said treatment by forming disfigurements on their rims, said disfigurements being visually apparent when articles are in the stack.

6. The method according to claim 5 wherein the rim is formed with a flange extending in an axial direction and which is at least partly exposed to view when articles are in a stack, and said disfigurements are provided upon the flanges so as to be visually identifiable when the treated articles are in the stack.

7. A method of continuously forming stackable articles in a moulding machine and forming a stack of said articles easily identifiable as to equally numbered batches of said stack comprising,
   (a) repeating a cycle of a moulding operation in a moulding station to make a predetermined number of identical articles in succession;
   (b) transmitting a signal to an automatic counting means as each cycle is performed;
   (c) stacking said identically moulded articles;
   (d) thereafter during the repeating cycle of moulding at least one article, following the moulding of a predetermined number of identical articles, activating a plunger operating means by said counting means after a predetermined member of signals have been received by said counting means to extend a plunger from the mould surface to alter the mould surface configuration and effect change in the shape of part of said article so that said article is easily identifiable from said identically moulded articles, said plunger operating means having a plunger with a surface flush with the mould surface during steps (a), (b) and (c);

(e) delivering said plunger changed article to said stack; and
(f) continuously repeating steps (a), (b), (c), (d) and (e).

* * * * *